(12) United States Patent
Leutenegger et al.

(10) Patent No.: US 10,361,542 B2
(45) Date of Patent: Jul. 23, 2019

(54) HIGH-PRESSURE FEEDTHROUGH FOR FEEDING THROUGH A COAXIAL CABLE INTO A HIGH-PRESSURE ZONE

(71) Applicant: Liebherr-Elektronik GmbH, Lindau (DE)

(72) Inventors: Paolo Leutenegger, Mochenwangen (DE); Tobias Zinner, Bellenberg (DE); Michael Scheidt, Wetzikon (CH); Michael Stucke, Ulm (DE)

(73) Assignee: Liebherr-Elektronik GmbH, Lindau (DE)

( * ) Notice: Subject to any disclaimer, the term of this patent is extended or adjusted under 35 U.S.C. 154(b) by 0 days.

(21) Appl. No.: 15/872,739

(22) Filed: Jan. 16, 2018

(65) Prior Publication Data
US 2018/0205208 A1 Jul. 19, 2018

(30) Foreign Application Priority Data
Jan. 17, 2017 (DE) .................. 10 2017 000 361

(51) Int. Cl.
| | |
|---|---|
| *H01B 11/12* | (2006.01) |
| *H01B 11/18* | (2006.01) |
| *H02G 1/08* | (2006.01) |
| *H02G 15/02* | (2006.01) |

(52) U.S. Cl.
CPC ............ *H02G 1/086* (2013.01); *H01B 11/12* (2013.01); *H01B 11/18* (2013.01); *H02G 15/025* (2013.01)

(58) Field of Classification Search
CPC ........ H01B 11/12; H01B 11/18; H01B 17/30; H01B 17/306; H02G 1/08; H02G 1/086; H02G 15/025

USPC ........................................... 174/71 C, 153 R
See application file for complete search history.

(56) References Cited

U.S. PATENT DOCUMENTS

| | | | | |
|---|---|---|---|---|
| 2,938,067 A | | 5/1960 | Werner | |
| 4,329,540 A | * | 5/1982 | Howarth | H01B 17/306 174/153 R |
| 5,091,987 A | * | 2/1992 | MacCulloch | G02B 6/3816 385/66 |
| 6,154,103 A | * | 11/2000 | Scharen | H01P 1/04 333/260 |

(Continued)

FOREIGN PATENT DOCUMENTS

| | | |
|---|---|---|
| DE | 1029895 B | 5/1958 |
| DE | 102011001985 C5 | 11/2016 |
| EP | 308557 A1 * 3/1989 | ............. H01R 17/12 |

*Primary Examiner* — Timothy J Thompson
*Assistant Examiner* — Guillermo J Egoavil
(74) *Attorney, Agent, or Firm* — McCoy Russell LLP

(57) ABSTRACT

The present disclosure relates to a high-pressure feedthrough for feeding through a coaxial cable from a low-pressure zone into a high-pressure zone, wherein the high-pressure feedthrough has a support structure having at least one elongate bore that extends from a low-pressure side of the support structure up to a high-pressure side of the support structure; wherein the elongate bore is suitable for receiving at least the inner conductor of a coaxial cable that can be continuously fed through the elongate bore from the low-pressure side to the high-pressure side; and wherein the high-pressure feedthrough has one or more components that serve in the axial direction of the elongate bore as an outer conductor and/or dielectric of the inner conductor of the coaxial cable fed through the elongate bore.

13 Claims, 3 Drawing Sheets

(56) References Cited

U.S. PATENT DOCUMENTS 6,590,471 B1 * 7/2003 Scharen .................... H01P 1/04
333/260
2017/0175476 A1 * 6/2017 Painter ................ E21B 33/0385

* cited by examiner

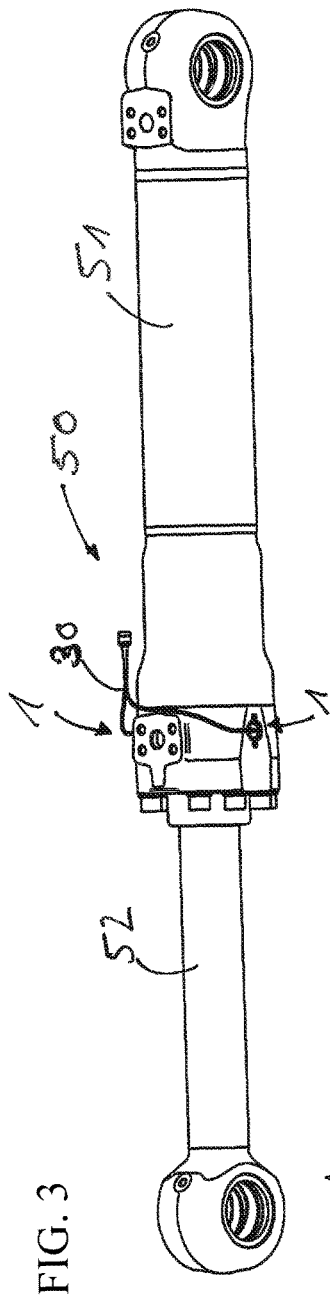
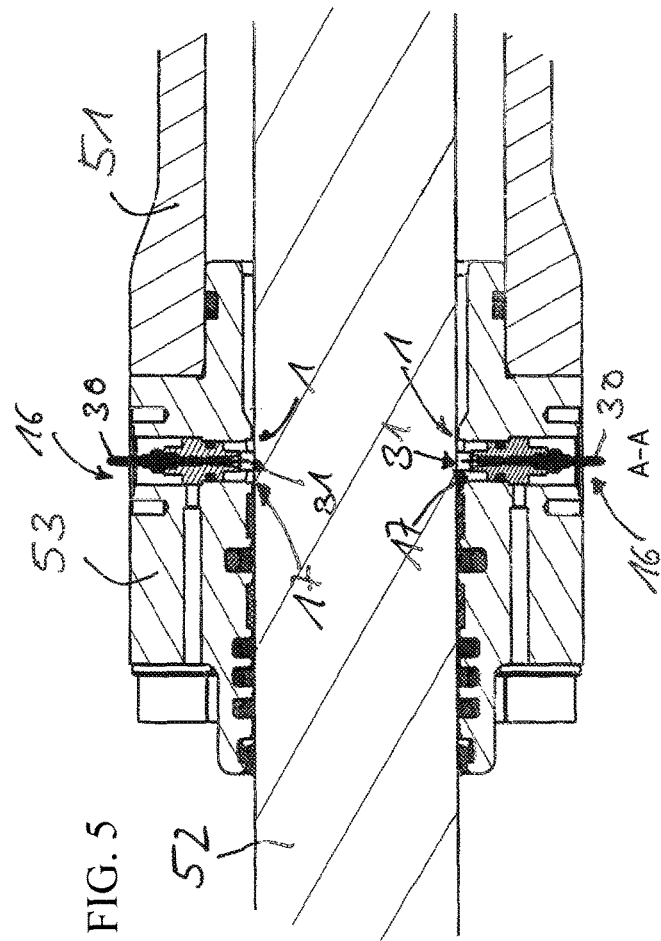
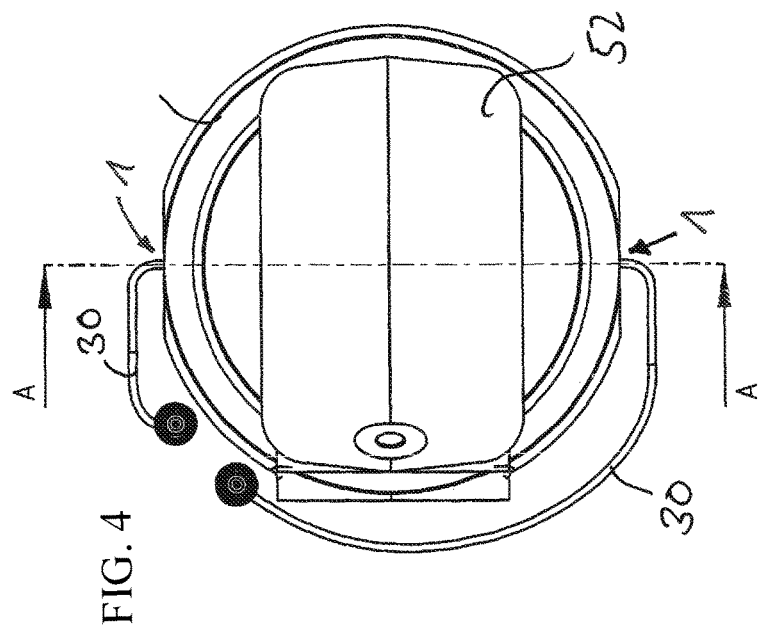
FIG. 3
FIG. 5
FIG. 4

HIGH-PRESSURE FEEDTHROUGH FOR FEEDING THROUGH A COAXIAL CABLE INTO A HIGH-PRESSURE ZONE

CROSS REFERENCE TO RELATED APPLICATION

The present application claims priority to German Patent Application No. 102017000361.0, entitled "High-Pressure Feed Through for Feeding Through a Coaxial Cable into a High-Pressure Zone," filed Jan. 17, 2017. The entire contents of the above-referenced application is hereby incorporated by reference in its entirety for all purposes.

TECHNICAL FIELD

The present disclosure relates to a high-pressure feedthrough for feeding through a coaxial cable from a low-pressure zone into a high-pressure zone.

BACKGROUND AND SUMMARY

A high-pressure feedthrough is often used within a hydraulic or pneumatic system in which a signal transmission should take place between regions having high pressure differences. A sufficient sealing in the region of the cable feedthrough is important with possible pressure differences of several hundred bar.

Problems can arise on the feeding through of coaxial cables that are used for the signal transmission of high-frequency signals on the order of 10 GHz. An exemplary application for the required feeding through of coaxial cables between a low-pressure zone and a high-pressure zone is the LiView measurement process which uses a vector measurement of the scatter parameters of a hydraulic cylinder. The process works at measurement frequencies on the order of 10 GHz that have to be coupled into or decoupled from the cylinder, i.e. the signal cables have to be introduced into the cylinder region from the outside.

It is important for the signal quality and for the accuracy of the measurement process that the transmitted signals are not impaired by interference in the transmission path. Unwanted reflections due to impedance fluctuations of the coaxial cable can degrade signal quality and the measurement.

The object of the present disclosure is to provide a suitable high-pressure feedthrough for a coaxial cable that is able to satisfy the above conditions.

In accordance with the present disclosure the high-pressure feedthrough comprises at least one support structure that is provided with an elongate bore. The elongate bore extends through the support structure from a high-pressure side to a low-pressure side. The high-pressure side of the support structure is connected to the high-pressure zone of the system when fitted of the high-pressure feedthrough in a hydraulic or pneumatic system. Whereas, the low-pressure side of the support structure is connected to the corresponding low-pressure environment. The elongate bore consequently permits a connection between the two pressure zones.

The structural design of the elongate bore is selected such that at least the inner conductor of a coaxial cable can be laid continuously through the elongate bore from the low-pressure side to the high-pressure side.

Certain cable elements have to be removed at least in certain sections of the elongate bore for an ideal seal with respect to the high-pressure side. The inner conductor of a coaxial cable may extend without interruption through the elongate bore from the low-pressure side to the high-pressure side. In sections of the elongate bore wherein parts of the coaxial cable have been removed, the functions of the removed parts are taken over by elements of the high-pressure feedthrough.

Possible connection points with impedance deviations are avoided by the interruption-free laying of at least the inner conductor of a coaxial cable through the total elongate bore, whereby the risk of signal reflections occurring can be reduced to a minimum. An interference-free transmission path with ideal electrical conducting properties can be provided when impedance jumps are consistently avoided. In addition, disclosed embodiments permits a compact construction shape and the integration of a plurality of functional elements produces cost benefits and reliability advantages.

In one embodiment, the transition of the outer conductor and/or of the dielectric of the coaxial cable to a component of the high-pressure feedthrough taking over the function of the outer conductor and/or dielectric takes place within the elongate bore. A small piece of the coaxial cable may accordingly project from the low-pressure side into the elongate bore. Removal of the protective jacket and, optionally, of the outer conductor and of the dielectric consequently only has to take place within the elongate bore. The transitions of the individual cable components to the components of the high-pressure feedthrough are particularly offset from one another in an axial direction. For example, the complete cable can, be inserted into the elongate bore from the low-pressure side. After a certain axial length of the elongate bore, the jacket surface of the coaxial cable has to be removed and the remaining coaxial cable comprising the outer conductor, the dielectric and the inner conductor is continued in the axial direction within the elongate bore. The outer conductor of the coaxial cable subsequently also has to be removed and the remaining components of the coaxial cable (dielectric and inner conductor) are fed further through in the axial direction in the elongate bore. From this section onward, a component of the high-pressure feedthrough takes over the function of the outer conductor. The dielectric of the coaxial cable is now also removed in a region axially offset therefrom and its function is taken over by a further component of the high-pressure feedthrough. Only the inner conductor of the coaxial cable now projects outward at the opening of the elongate bore disposed at the high-pressure side. The individual cable components accordingly have to be successively removed from the outside to the inside until only the uninsulated inner conductor remains and can exit the high-pressure feedthrough at the high-pressure side.

The function of the outer conductor can, for example, be taken over by the support structure of the high-pressure feedthrough. It may be designed as electrically conductive for this role. In addition, an electric contact of the support structure to the outer conductor of the coaxial cable may be necessary. This electrical connection may take place either by a direct contact or an alternative such as a curved metallic contact element.

An element of the high-pressure feedthrough taking over the function of the dielectric of the coaxial cable may be a sealing compound or a sealing element that is introduced into the elongate bore. This sealing compound or the sealing element also serves as the dielectric in addition to the sealing function of the high-pressure side with respect to the low-pressure side. For this purpose, it coaxially surrounds the inner conductor fed through the elongate bore in at least one part section of the elongate bore. A polymer compound, such as an epoxy resin, has proven to be a particularly suitable sealing compound that may be poured into the elongate bore and consequently enters into a connection having material continuity with the respective section of the support structure and the inner conductor.

The sealing element may be a special sealing body that is positioned at a corresponding point in the elongate bore. The sealing element is resilient and may compress. The sealing element may develop its full sealing effect on a corresponding pressure exertion from the high-pressure side.

In one embodiment, the elongate bore may have a plurality of sections having mutually differing diameters. Different components of the coaxial cable may be introduced in the different sections. Different functions of the coaxial cable may also be implemented by components of the high-pressure feedthrough. A first section of the elongate bore is, for example, in the region close to low pressure wherein the diameter is coordinated with the diameter of a conventional coaxial cable having a complete structure. A coaxial cable, including its jacket surface, may thereby be introduced into said section of the elongate bore with proper fit. Another embodiment may feature a bore diameter that is larger in this region and the cable can be introduced into the elongate bore with a sleeve surrounding the jacket.

In an embodiment an one adjoining further section is characterized by an inner diameter of the elongate bore reduced with respect to the first section. This reduced diameter allows a fitting reception of a coaxial cable in which at least one cable component has previously been removed. Different regions may be configured for proper fitting reception of a coaxial cable having a removed jacket or a removed jacket and outer conductor. These regions are may follow one another in the axial direction toward the high-pressure side.

Another embodiment may feature a further section having an increased inner diameter of the elongate bore. Only an inner conductor of the coaxial cable may be able to be introduced in this section. This section may be the region of the opening of the elongate bore toward the high-pressure side. An annular space may form due to the spacing of the inner wall from the inner conductor and said annular space may fill with fluid due to its opening toward the high-pressure side. The fluid inflowing in this region consequently lies around an introduced inner conductor in an annular and coaxial manner and may perform the function of the dielectric. The fluid may flow to the sealing compound introduced within the elongate bore or to the sealing element introduced within the elongate bore.

In an embodiment this fluid may flow toward the seal if the introduced sealing compound or the introduced sealing element is adjacent to at least one abutment within the elongate bore in the axial direction. As previously explained, the inflowing fluid of the high-pressure side moves up to the sealing compound or up to the sealing element within the elongate bore. An axially directed force may act on the sealing compound or the sealing element and presses it onto the abutment due to the pressurized fluid. A compression of the sealing compound or of the sealing element consequently occurs, whereby its sealing effect is improved. At least one abutment may be formed by a step-like diameter tapering of the elongate bore. A support element may be used in the elongate bore that comprises a suitable abutment surface for the sealing compound or sealing element. The support element likewise comprises a central bore through which the inner conductor can extend. The support element may provide sections having different outer diameters so that the element may extend over a plurality of sections of the elongate bore. The front face of the support element facing the sealing element may comprise a planar surface to provide an abutment surface that is large and stable.

The support element may comprise a comparatively strong material such as ceramic, glass, plastic or another non-electrically conductive material or a combination of the aforesaid materials.

In accordance with an embodiment, at least one cap nut seated on the outer periphery of the support structure may be provided to install the high-pressure feedthrough at a structure separating the high-pressure zone and the low-pressure zone. The high-pressure feedthrough may be screwed in a separating structure by means of the cap nut.

In addition, one or more outer sealing elements may be provided to enable a sealing introduction of the high-pressure feedthrough into the supporting structure. One or more O rings seated on the outer periphery of the support structure may serve this purpose.

Additionally, the present disclosure likewise relates to a hydraulic or pneumatic system which has at least one structure separating a high-pressure zone and a low-pressure zone and into which at least one high-pressure feedthrough may be introduced. At least one coaxial cable may be led through this high-pressure feedthrough from the low-pressure side into the high-pressure side.

In one embodiment a piston-in-cylinder unit is provided. The high-pressure feedthrough serves the feeding through of a coaxial cable from the outside into the high-pressure zone disposed within the cylinder or the feeding through the cylinder jacket or a corresponding housing part. The introduction of a coaxial cable into the cylinder space may be used in applications in which physical properties of the piston-in-cylinder unit should be detected by means of a measurement device. The current piston position may be determined using these measured parameters. The measurement process makes use of high-frequency signals that have to be coupled into or decoupled from the cylinder space by one or more coaxial cables.

One embodiment features a diameter of the section of the elongate bore forming the annular space and/or the diameter of the section of the elongate bore receiving the sealing compound or the sealing element may be coordinated with the dielectric properties of the fluid to be used so that both the fluid and the sealing compound or sealing element have similar dielectric properties to the original dielectric of the coaxial cable. Impedance deviations of the coaxial cable occur within the high-pressure feedthrough may thereby be achieved.

The LiView measurement process that is based on a vector measurement of the scatter parameters of a cylinder may be implemented by the measurement apparatus. Measurement frequencies on the order of 10 GHz may be used here. To couple and decouple these high-frequency signals into and out of the cylinder, the special high-pressure feedthrough is used whose very compact construction shape ensures the coaxial feedthrough of a high-frequency signal in the above frequency range to the high-pressure cylinder space.

Further advantages and properties of the disclosure will be explained in more detail in the following with reference to an embodiment shown in the figures.

BRIEF DESCRIPTION OF THE FIGURES

FIG. 3 shows a side view of the piston-in-cylinder unit with inserted high-pressure feedthroughs.

FIG. 4 shows a front view of the piston-in-cylinder unit onto the piston boss.

FIG. 5 shows a sectional representation through the piston support with the received high-pressure feedthroughs along the section axis A'A of FIG. 4.

DETAILED DESCRIPTION

Figure 1:
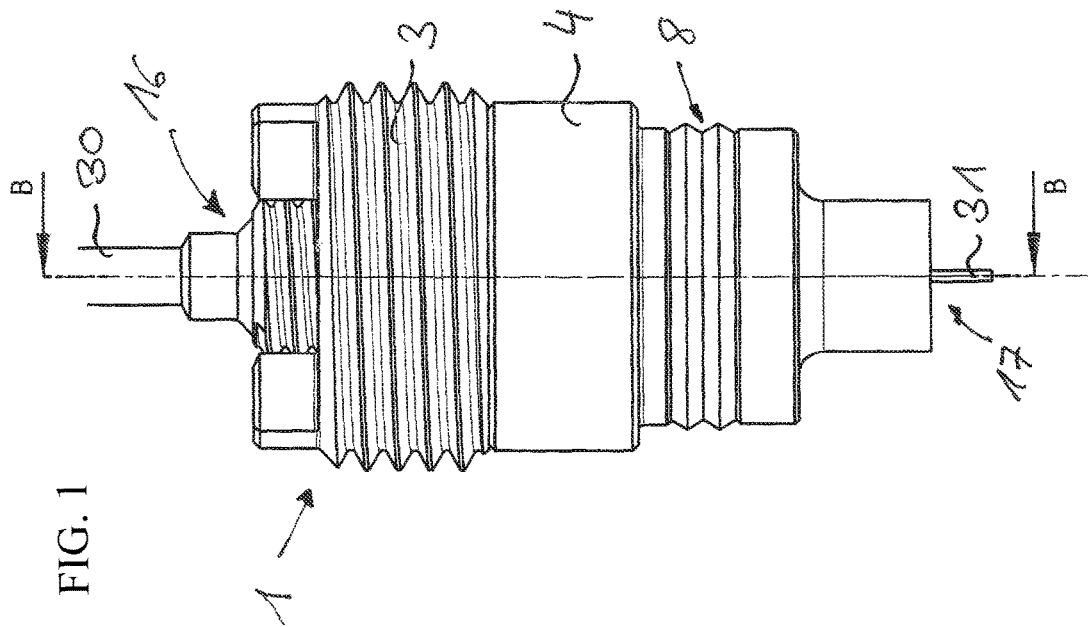
FIG. 1 shows a side view of the high-pressure feedthrough.

FIG. 1 shows a side view of the high-pressure feedthrough 1. The housing of the high-pressure feedthrough 1 forms an electrically conductive support structure 4. The housing shape is cylindrical in at least one portion, i.e. the housing diameter varies in an axial direction.

Figure 2:
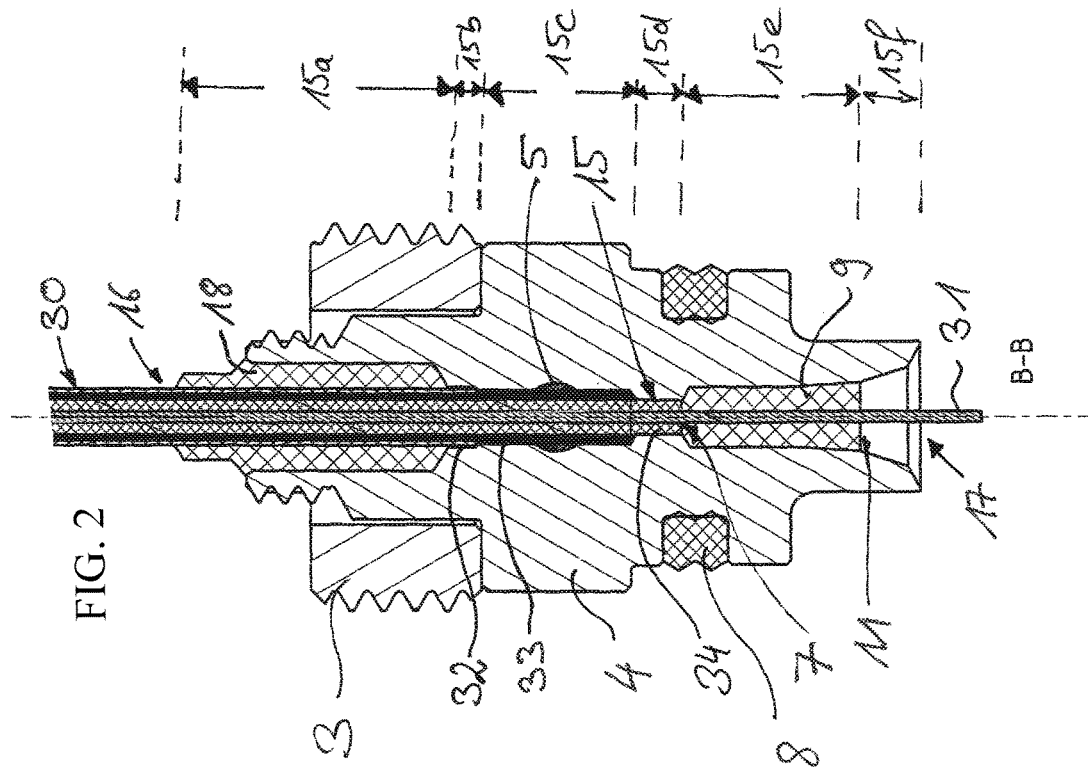
FIG. 2 shows a sectional representation through the high-pressure feedthrough of FIG. 1 along the section axis B'B.

In the sectional representation of FIG. 2, the elongate bore 15 can be recognized that completely passes through the support structure 4 in the axial direction. The elongate bore 15 is accessible from the outside via upper and lower housing openings 16, 17. The pressure feedthrough 1 serves the feeding through of a coaxial cable from a low-pressure zone into a high-pressure zone. In the assembly position, the opening 16 is in the low-pressure zone and the opening 17 is in the high-pressure zone. Consequently, a passage is created between both pressure zones by the elongate bore 15. In the representation of the figures, the introduced coaxial cable is marked by reference numeral 30.

The geometric design of the high-pressure feedthrough assists a coaxial feeding through of the inner conductor of a coaxial cable. Additional interfaces or interruptions of the inner conductor along the signal path may not be necessary, whereby the risk of signal reflections in the high-frequency signal due to impedance changes may be avoided. Consequently, ideal electrical properties may be achieved. Cost benefits and reliability advantages result with respect to other solutions due to the compact construction shape and the integration of a plurality of functional elements.

FIG. 2 shows an embodiment of an elongate bore 15 is divided into a plurality of sections whose bore diameters differ from one another. A first section 15a has a sufficient bore diameter to receive the complete coaxial cable 30 including its jacket surface 32. The cable 30 is fixed within the bore 15 by the sleeve 18. The bore diameter is adapted to the outer diameter of the jacket 32 in the region 15b.

The bore diameter in the section 15c may be selected as slightly smaller than section 15b. Only the jacket surface 32 of the coaxial cable 30 is removed in this region, whereby the outer conductor 33 of the cable 30 directly contacts the support structure 4. The bore diameter in the following section 15d is selected such that the dielectric 34 of the cable 30 can directly lie at the inner bore wall of the support structure 4 with a removed outer conductor 33. The region 15d may have the smallest bore diameter of the total elongate bore 15. The region 15e in turn may have a larger bore diameter. However, only the inner conductor 31 of the cable 30 is laid in this region.

The high-pressure feedthrough 1 realizes a coaxial structure of the cable 30 over the total length from the low-pressure side to the high-pressure side, i.e. also for the sections in which a portion of the cable 30 has been removed in advance. The function of the removed cable portions is taken over here by the support structure 4 or by the sealing compound 9. The cable 30 is still complete in the region 15a and 15b. In the region 15c, however, the cable jacket 32 is removed and the outer conductor (shielding) 33 of the cable 30 is electrically contacted with the conductive support structure 4 in the region 5. For this purpose, the shielding 33 may either be electrically connected to the support structure 4 directly and/or additionally by means of a contact element such as a crimped metallic contact element.

The dielectric 34 of the cable 30 is moreover removed in the region 15e. A polymeric sealing compound 9 has been introduced into the elongate bore in this region and also serves the high-pressure sealing of the inner conductor 31 or of the low-pressure side with respect to the high-pressure side in addition to the electrical insulation of the inner conductor 31 with respect to the conductive support structure 4. The use of an epoxy resin as a potting compound 9 is suitable, for example. Alternatively, further resilient materials can also be used that (electrically) match both the sealing function and the electrical insulation in accordance with the load (pressure) and functional conditions.

The sealing compound 9, however, does not reach up to the high-pressure opening 17. A section 15f having a bore diameter conically increasing in the opening direction namely adjoins the region 15e. The uninsulated inner conductor 31 is disposed within this region. The formed annular space that is coaxially disposed around the inner conductor 31 and can be filled with the inflowing fluid of the high-pressure side via the high-pressure opening is formed between the inner wall of the support structure 4 and the inner conductor 31. The fluid consequently acts as a dielectric in this section. The uninsulated inner conductor 31 is consequently led through the constriction 7 of the support structure 4 and through the sealing compound 9 up to and into the high-pressure space, where the transmitted signal may be tapped at the projecting inner conductor 31.

The constriction 7 additionally provides that the sealing compound 9 may be pressed toward the constriction 7 by the pressure load of the fluid inflowing into the annular space of the section 15f and is consequently compressed in the axial direction. The sealing function of the sealing compound 9 is thereby additionally amplified. The maximum pressure that can be withstood over the sealing cross-section 11 is determined via the limit at which the sealing compound 9 can be extruded through the opening of the constriction 7. This typically takes place under pressure relationships that are widely above the customary operating pressures.

The diameter of the elongate bore of the conductive support structure 4 in the individual sections is configured for an ideal impedance matching. For this reason, the diameter in the section 15e may increase in the direction of the high-pressure space. For example, the diameter may increase in the transition region between the constriction 7 and the sealing cross-section 11 in accordance with the dielectric properties of the potting compound 9 and may increase in section 15f in accordance with the dielectric properties of the fluid. The cable may have an approximately constant impedance over the total elongate bore due to the measure, whereby reflections of a transmitted high-frequency signal are avoided or largely reduced.

The mechanical fastening of the high-pressure feedthrough in the hydraulic system is realized via a cap nut 3 in FIG. 2. Other assembly and sealing concepts with respect to the hydraulic system are possible with an unchanged high-pressure feedthrough function. The high-pressure sealing toward the hydraulic system (e.g. toward the cylinder piston rod bearing of a hydraulic cylinder) can be implemented via sealing elements such as O ring 8.

FIG. 3 shows of an embodiment of a side view of the cylinder piston unit 50. The cylinder piston unit 50 comprises a cylinder jacket 51 and piston axially supported therein with the piston rod 52. Two high-pressure feedthroughs 1 are introduced in the region of the piston rod support 53, shown in FIG. 5. These high-pressure feedthroughs 1 introduce two coaxial cables 30 into the high-pressure zone of the piston-in-cylinder unit 50 starting from the measurement apparatus. As can be seen in FIG. 4, the high-pressure feedthroughs 1 are screwed into the piston support 53 at radially oppositely disposed sides of the jacket surface 50.

The end of the inner conductor 31 that projects into the cylinder space can be recognized in the sectional representation of FIG. 5.

Figure 6:
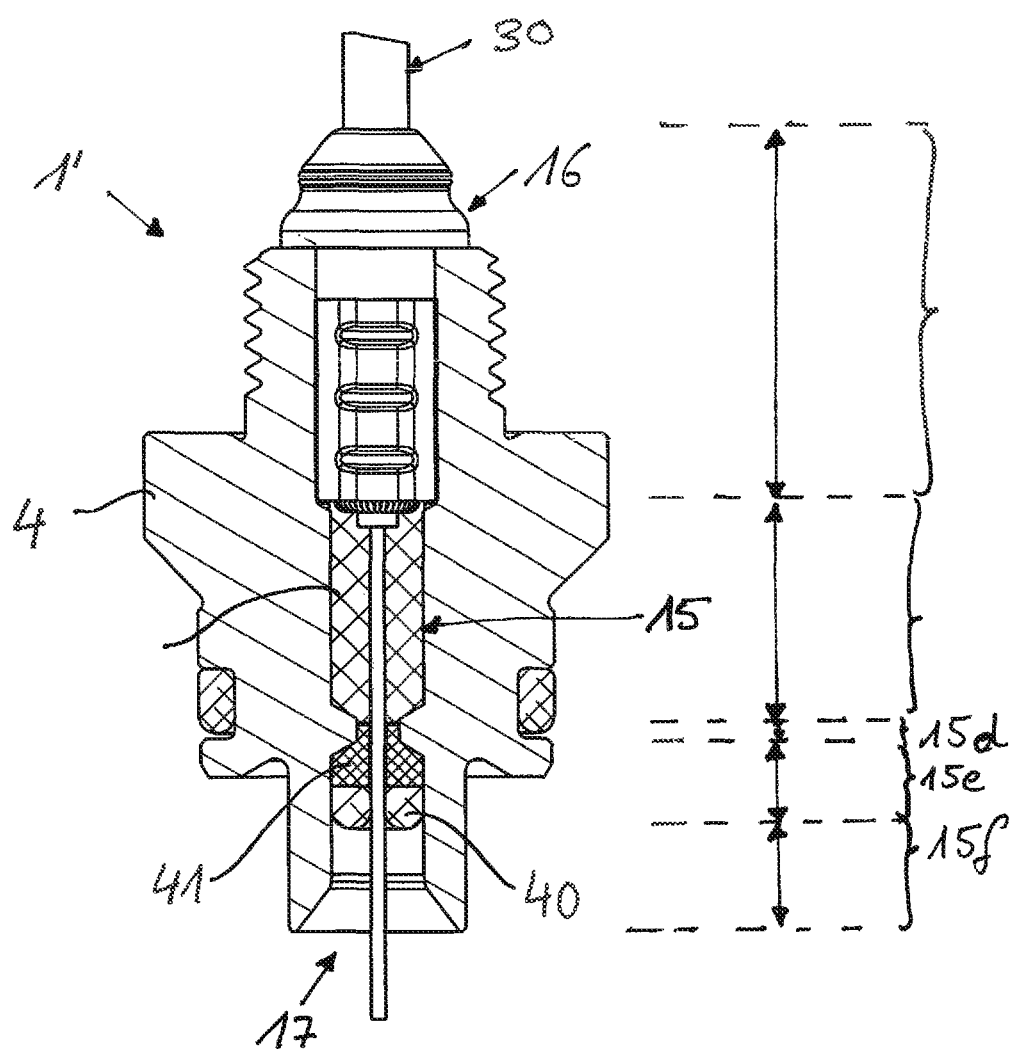
FIG. 6 shows an alternative embodiment of the high-pressure design shown in a sectional representation along a section axis analog to FIG. 2.

A modified embodiment of the high-pressure feedthroughs shown in FIG. 6. The embodiment of FIG. 6 includes a seal between the high-pressure side and the low-pressure side integrated in the high-pressure feedthrough. Components of FIG. 6 having an identical function or implementation in comparison with the embodiment of FIGS. 1 to 5 are therefore marked by identical reference numerals in FIG. 6. These components will also no longer be looked at in any more detail in the following.

A resilient sealing element 40 may be introduced in the region 15*e* of the elongate bore instead of the potting compound 9 used in the embodiment of FIGS. 1 to 5. In addition, a support element 41 composed of a comparatively strong material is used as the abutment for the sealing element 40. The support element 41 has a varying outer diameter and completely fills the section 15*d* having the smallest inner diameter of the elongate bore 15. The support element 41 extends into the region 15*e*, with the outer diameter of the support element 41 here being correspondingly adapted to the inner diameter of the bore 15. The front face of the support element 41 facing the opening 17 provides a planar surface to form an abutment that may feature a large and stable area. This surface can possibly also be slightly curved to ensure a stable reception of the sealing element 40 on a pressure load. The support element 41 has to be as non-resilient as possible; glass, ceramics or plastic can be named as suitable materials.

The resilient sealing element 40 may be pressed onto the support element 41 by the pressure load of the fluid inflowing into the annular space of the section 15*f*, whereby the sealing element 40 is compressed in the longitudinal direction. Unsealed spaces or gaps within the sealing element 40 are filled by the pressure-induced deformation, whereby the sealing element 40 develops its complete sealing effect.

As in the previous embodiment, the support element 41 and the sealing element 40 serve as a replacement for the dielectric of the coaxial cable 30 removed in this section.

The functions of the electrical connection and high-pressure feedthrough may be separate in the high-pressure feedthrough 1. The electrical connection of the outer conductor 33 may take place in the low-pressure zone and has low demands for leak-tightness and may not require any connections having material continuity. For example, a conventional crimping processes may be used. The insertion with longitudinal compressive strength of the high-pressure feedthrough 1 may be selectively implemented via an introduced outer seal 8 toward the reception bore in the high-pressure hydraulic chamber with a radially force-fitting action. The insertion may also be implemented via the seal of the inner conductor 31 with respect to the outer conductor 33 takes place directly in a bore 15 which is formed in a high-pressure application and in which the pressure-sealing polymer 9, or force-fitting seal 40 or polymeric potting compound 9 acting with material continuity, is introduced to be loaded directly in cross-section with respect to alternating application of pressure.

The high-pressure feedthrough 1 in accordance with FIGS. 1 to 5 may be implemented via two transition points namely the transition between the metallic support structure 4 and the sealing compound 9 or between the sealing compound 9 and the inner conductor 31. A very simple construction of the feedthrough is thereby created that can also be favorably manufactured. In the modified embodiment in accordance with FIG. 6, two boundary surfaces between the outer conductor, insulation material having a pressure sealing function, and a solid inner conductor over the same cross-sectional length are created for the pressure sealing. The sealing and electrically insulating function is also ensured by the polymer material properties of the sealing element 40 and by tuned geometrical dimensions with respect to one another and thereby reduces the length of the pressure feedthrough function to a minimum.

The invention claimed is:

1. A high-pressure feedthrough for feeding through a coaxial cable from a low-pressure zone into a high-pressure zone, the high-pressure feedthrough comprising:
    a support structure having at least one elongate bore that extends from a low-pressure side of the support structure to a high-pressure side of the support structure;
    wherein the elongate bore is suitable for receiving an inner conductor of the coaxial cable and the coaxial cable is fed through the elongate bore from the low-pressure side to the high-pressure side; and
    one or more components that serve as an outer conductor or a dielectric of the inner conductor of the coaxial cable fed through the elongate bore, wherein the support structure is electrically connectable to the outer conductor of the coaxial cable, and where the support structure is electrically conductive and serves as the outer conductor of the coaxial cable.

2. The high-pressure feedthrough of claim 1, wherein a transition of the one or more components taking over a function of the outer conductor or the dielectric of the inner conductor is disposed within the elongate bore.

3. The high-pressure feedthrough of claim 2, wherein a plurality of transitions is disposed within the elongate bore and is offset from one another in an axial direction.

4. The high-pressure feedthrough of claim 1, wherein a sealing compound or a sealing element in the elongate bore serves as the dielectric for the inner conductor of the coaxial cable.

5. The high-pressure feedthrough of claim 4, wherein the sealing compound is a polymer or an epoxy resin.

6. The high-pressure feedthrough of claim 1, wherein the elongate bore has a plurality of sections having variable diameters and has a section for reception of a complete coaxial cable.

7. The high-pressure feedthrough of claim 6, further comprising a section of the elongate bore for the reception of the outer conductor, the dielectric, and the inner conductor or the reception of the dielectric and the inner conductor.

8. The high-pressure feedthrough of claim 1, wherein a sealing compound or a sealing element is in a region of the elongate bore facing the high-pressure side and the sealing compound or the sealing element is compressible.

9. The high-pressure feedthrough of claim 8, wherein an abutment is adjacent to the sealing compound or the sealing element, the abutment formed by a step-like diameter tapering of the elongate bore or by an insulating support element introduced into the elongate bore.

10. The high-pressure feedthrough of claim 1, wherein the elongate bore forms an annular space between the support structure and the inner conductor of the coaxial cable at an inlet facing the high-pressure zone.

11. The high-pressure feedthrough of claim 10, wherein the annular space is configured to receive a fluid.

12. The high-pressure feedthrough of claim 1, wherein the supporting structure has a cap nut for fitting to a structure separating the high-pressure zone and the low-pressure zone.

13. The high-pressure feedthrough of claim 1, wherein one or more sealing elements or O rings are provided at an outer side of the support structure.

* * * * *